(12) United States Patent
Wang et al.

(10) Patent No.: US 7,505,491 B1
(45) Date of Patent: Mar. 17, 2009

(54) FREQUENCY-CONVERTED HIGH-POWER LASER WITH RECIRCULATING POLARIZATION CONTROL

(75) Inventors: Gary Y. Wang, Fremont, CA (US); Norman Hodgson, Belmont, CA (US); H. Yang Pang, San Jose, CA (US); R. Russel Austin, Cool, CA (US)

(73) Assignee: Coherent, Inc., Santa Clara, CA (US)

( * ) Notice: Subject to any disclaimer, the term of this patent is extended or adjusted under 35 U.S.C. 154(b) by 55 days.

(21) Appl. No.: 11/897,369

(22) Filed: Aug. 29, 2007

(51) Int. Cl.
*H01S 3/10* (2006.01)
*H01S 3/081* (2006.01)
*H01S 3/082* (2006.01)

(52) U.S. Cl. ............... 372/27; 372/21; 372/93; 372/97

(58) Field of Classification Search ............ 372/21, 372/22, 27, 92, 93, 94, 97, 99
See application file for complete search history.

(56) References Cited

U.S. PATENT DOCUMENTS

| | | | |
|---|---|---|---|
| 4,660,205 A | 4/1987 | Harter et al. .............. 372/18 |
| 6,587,497 B1 | 7/2003 | Libby et al. .............. 372/99 |
| 2003/0035448 A1 | 2/2003 | Yin .......................... 372/22 |
| 2003/0142703 A1 | 7/2003 | Gao et al. ................. 372/21 |
| 2005/0129081 A1 | 6/2005 | Erhard et al. ............ 372/71 |
| 2007/0286247 A1 | 12/2007 | Pang et al. .............. 372/10 |
| 2008/0175296 A1 | 7/2008 | Kumkar .................... 372/70 |

FOREIGN PATENT DOCUMENTS

JP   4-275475   10/1992

OTHER PUBLICATIONS

N. Hodgson et al., *Laser Resonators and Beam Propagation*, 2nd Edition, published by Springer Science & Business Media, Inc. (2005), Chapter 8, entitled "Resonators with Internal Optical Elements," numbered sections 8.11 through 8.2.7, pp. 352-361.

*Primary Examiner*—Armando Rodriguez
(74) *Attorney, Agent, or Firm*—Stallman & Pollock LLP

(57) ABSTRACT

A frequency-tripled laser-resonator has three resonator-branches. The branches are optically connected with each other by one or more polarization-selective devices. Unpolarized fundamental radiation is generated by optically pumping a gain-element in one branch of the resonator. The polarization-selective device provides that radiation in the other branches is plane-polarized, with the polarization planes of radiation entering the branches perpendicular to each other. Two optically nonlinear crystals are located in one of the branches of the resonator in which the fundamental radiation is plane-polarized and arranged to generate third-harmonic radiation. Three-branch resonators including two gain-elements having a optical relay therebetween, and a three-branch ring-laser-resonator are also disclosed.

23 Claims, 5 Drawing Sheets

FREQUENCY-CONVERTED HIGH-POWER LASER WITH RECIRCULATING POLARIZATION CONTROL

TECHNICAL FIELD OF THE INVENTION

The present invention relates in general to intracavity frequency-converted, diode-pumped, solid-state lasers. The invention relates in particular to such lasers having a gain-medium optically pumped at a power high enough to cause thermal-birefringence in the gain-medium sufficient that fundamental-wavelength radiation generated in the laser is unpolarized.

DISCUSSION OF BACKGROUND ART

In a laterally diode-pumped, solid-state laser, such as a laser having a resonator including a neodymium-doped yttrium aluminum garnet (Nd:YAG) gain-medium, laser pump-power can be raised to a level at which thermally induced birefringence in the Nd:YAG gain-medium can cause fundamental-wavelength radiation circulating in the resonator to be unpolarized. The radiation can not be caused to be polarized without considerable loss of efficiency of generating the radiation.

Unpolarized fundamental-wavelength radiation can be frequency-doubled in an optically nonlinear crystal, as the crystal can resolve from the unpolarized radiation a portion thereof that is polarized in an orientation for which the crystal is cut. Intracavity frequency-tripling, however, involves a frequency-doubling step in a first optically nonlinear crystal and a sum-frequency mixing step (in which fundamental-wavelength radiation is mixed with the frequency-doubled radiation) in a second optically nonlinear crystal. This is about 50% less efficient with unpolarized fundamental-wavelength radiation, as the fundamental-wavelength radiation and the frequency-doubled radiation entering the crystal must both be polarized on entering the second crystal, with the polarization planes being either the same or perpendicular to each other, depending on whether the sum-frequency mixing is of type-I or type-II, respectively.

There is a need for a high-power solid-state laser-resonator arrangement in which polarized radiation can be generated efficiently at high power even in the presence of strong thermal birefringence in the gain-medium. The resonator arrangement should be adaptable for efficient intracavity frequency-conversion in one or more optically nonlinear crystals.

SUMMARY OF THE INVENTION

In one aspect a laser in accordance with the present invention comprises a laser-resonator having first, second, and third branches. At least one gain-element is located in the third branch of the resonator. An arrangement is provided for optically pumping the gain-element such that laser radiation having a fundamental wavelength circulates in the laser-resonator. One or more polarization-selective devices optically connect the first and second branches of the resonator to the third branch of the resonator. The polarization-selective devices and the laser-resonator are arranged such that fundamental-wavelength radiation in the first and second resonator-branches is polarized in respectively first and second orientations perpendicular to each other. At least one optically nonlinear crystal is located in the first branch of the resonator and arranged to convert a portion of the fundamental-wavelength radiation to frequency-converted radiation having a wavelength different from the fundamental wavelength.

In another aspect a laser in accordance with the present invention comprises a laser-resonator having first, second, and third branches. First and second gain-elements are located in the third branch of the resonator. A unit-magnification optical relay and a polarization rotator are located between the first and second gain elements. An arrangement is provided for optically pumping the gain-elements such that laser radiation having a fundamental wavelength circulates in the laser-resonator. A polarization-selective device optically connects the first and second branches of the resonator to the third branch of the resonator. A fractional-wave plate is located in the third branch of the laser-resonator between the first gain-element and the polarization selective-device. The polarization-selective device, the fractional-wave plate, and the laser-resonator are arranged such that fundamental-wavelength radiation in the first and second resonator-branches is polarized in respectively first and second orientations perpendicular to each other.

In yet another aspect, a laser in accordance with the present invention comprises a ring laser-resonator having first, second, and third branches. At least one gain-element and a fractional-wave plate are located in the third branch of the resonator. An arrangement is provided for optically pumping the gain-element such that laser radiation having a fundamental wavelength circulates in the laser-resonator. An optical diode is positioned in one of the first and second resonator-branches such that the fundamental-wavelength radiation circulates in only one direction in the laser-resonator. First and second polarization-selective devices optically connect the first and second separate branches of the resonator to the third branch of the resonator. The laser-resonator, the fractional-wave plate, and the one or more polarization-selective devices are arranged such that fundamental-wavelength radiation in the first and second resonator-branches is polarized in respectively first and second orientations perpendicular to each other.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
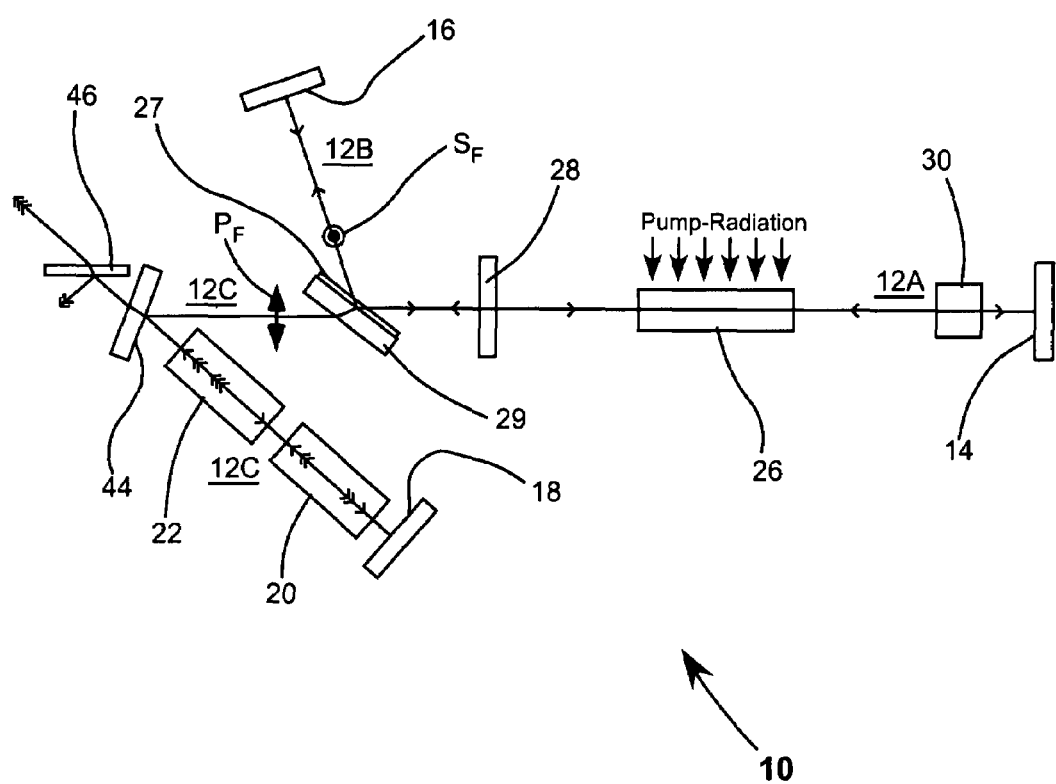
FIG. 1 schematically illustrates one preferred embodiment of a laser in accordance with the present invention including a standing-wave resonator having a first branch in which circulating fundamental-wavelength radiation is p-polarized and in which a second-harmonic generating crystal and a third-harmonic generating crystal are located, a second branch in which circulating fundamental-wavelength radiation is s-polarized, and a third branch in which a gain-medium and a quarter-wave-plate are located and in which circulating fundamental-wavelength radiation is essentially unpolarized, with the resonator-branches being optically connected by a polarization-selective reflector.

Referring now to the drawings, wherein like components are designated by like reference numerals, FIG. 1 schematically illustrates one preferred embodiment 10 of an intracavity-frequency-tripled laser in accordance with the present invention. Laser 10 includes a standing-wave resonator having branches 12A, 12B and 12C terminated by mirrors 14, 16, and 18 respectively. Located in branch 12C is an optically nonlinear crystal 20 arranged for converting fundamental-wavelength radiation (designated by single arrowheads F) to second-harmonic radiation (designated by double arrowheads 2H) having a wavelength one-half of the fundamental wavelength. Also located in branch 12C is an optically nonlinear crystal 22 arranged for type-II sum-frequency mixing of the 2H-radiation with residual fundamental-wavelength radiation from the second-harmonic conversion process to generate third-harmonic radiation (designated by triple arrows 3H) having a wavelength one-third of the fundamental wavelength. Here it should be noted that mirrors 14, 16, and 18 are highly reflective for fundamental-wavelength radiation. Mirror 18 is additionally highly reflective for 2H-radiation. Branch 12C of the resonator is folded by a dichroic mirror 44 that is highly reflective for fundamental wavelength radiation and highly transmissive for 2H-radiation and 3H-radiation.

The resonator-branches are optically combined by a polarization-selective reflector, here, formed by a multilayer coating 27. The polarization selective reflector is deposited on a substrate 29. Polarization-selective reflector 27 is highly reflective for fundamental-wavelength radiation s-polarized with reference to the polarization-selective reflector. The polarization-selective reflector is transparent to fundamental-wavelength radiation p-polarized with reference to the polarization selective reflector. The inclination of substrate 29 on which the polarization selective reflector is deposited is preferably selected such that radiation is incident thereon at about the Brewster angle. The term "polarization-selective reflector" is used here arbitrarily. As the polarization-selective reflector is also a polarization-selective transmitter, the term "polarization-selective device" may be used generally, with a recognition that the polarization-selectivity thereof can also be wavelength-dependent.

Located in branch 12A is a gain-medium (gain-rod) 26. Optical pump-radiation is delivered laterally to the rod as indicated by a plurality of arrows. Also located in resonator-branch 12A are a polarization-retarding (polarization rotating device) 28, which is preferably a quarter-wave plate at the fundamental wavelength, and a Q-switch 30 for pulsed operation of the resonator.

The optical pump-radiation is preferably supplied by a linear array of diode-laser bars (not shown). This optical pumping thermally induces a polarization-scrambling birefringence in the gain-medium, causing fundamental-wavelength radiation generated by the gain-medium to be essentially unpolarized. The term "essentially unpolarized", as used in this description and the appended claims, means only that the radiation is definitely not plane-polarized. The polarization state may be circular, elliptical, or random or some combination thereof and may vary with time or pump-power.

Whatever the polarization-state of fundamental-wavelength radiation incident polarization selective reflector 27, the radiation is resolved into p-polarized and s-polarized components with polarization orientations perpendicular to each other. P-polarized fundamental-wavelength radiation is transmitted into resonator-branch 12C and s-polarized fundamental-wavelength radiation is reflected into resonator-branch 12B. The mutually perpendicular polarization-orientations of the plane-polarized fundamental-wavelength radiation are indicated by double arrows $P_F$ and arrowheads $P_S$.

P-polarized fundamental-wavelength radiation transmitted into resonator-branch 12C is transmitted by optically nonlinear crystal 22 and a portion of that fundamental-wavelength radiation is converted to 2H-radiation on a first pass through optically nonlinear crystal 20. Unconverted fundamental-wavelength radiation and 2H-radiation are reflected from mirror 18 and a further portion of the fundamental-wavelength radiation is converted to 2H-radiation on a second pass through optically nonlinear crystal 20. A portion of the residual fundamental-wavelength radiation and 2H-radiation are converted to 3H-radiation in optically nonlinear crystal 24 by sum-frequency mixing as discussed above.

Residual 2H-radiation and the sum-frequency generated 3H-radiation are transmitted out of the resonator via dichroic mirror 44. 2H-radiation is then separated from the 3H radiation by another dichroic mirror 46 that is highly reflective for 2H radiation and highly transmissive for 3H-radiation. Residual fundamental-wavelength radiation, still being p-polarized, is transmitted by polarization selective reflector 27 back into resonator-branch 12A, through quarter-wave plate 28 to make a double pass thorough the gain-medium.

On first consideration, it might appear that at most only one-half of the fundamental-wavelength radiation generated by the gain-medium is available for harmonic conversion. This, however, is not the case for reasons as follows. In a double-pass of the fundamental-wavelength through quarter-wave plate 28, all plane polarized components of the radiation, whatever the absolute orientation thereof, have that orientation rotated by 90°. Accordingly, any P-polarized radiation that emerges from branch 12C of the resonator after a double pass through the gain-medium and the quarter-wave plate 28 will be directed into branch 12B by the polarization-selective device. Similarly, S-polarized fundamental-wavelength radiation emerging from branch 12B in the resonator after a double pass through the gain-medium and the quarter-wave plate 28 will be directed into resonator-branch 12C by the polarization selective device. Because of this, all of the fundamental-wavelength radiation generated by the gain-medium is available for harmonic conversion in resonator-branch 12C. Accordingly, the efficiency of harmonic-generation can be comparable with that of similar harmonic-generation from plane-polarized fundamental-wavelength radiation circulating in a conventional, two-mirror, standing-wave resonator.

It has been found that the use in particular of quarter-wave plate 28 in resonator-branch 12A can minimize gain-competition and provides that fundamental power in resonator-branches 12B and 12C is about equal (balanced), thereby maximizing harmonic-conversion efficiency. Further the quarter-wave plate is insensitive to temperature variations which are essentially inevitable in a high-power resonator. The use of a polarization rotating device that is highly temperature-sensitive, such as a Faraday rotator, is not recommended, as this can lead to variations in the harmonic conversion efficiency with corresponding instability of the 3H-radiation output. It is possible that another fractional-wave plate may function in the resonator, however, the quarter-wave plate has been found to function predictably.

It has also been found that there is a relatively critical range of pump powers above which the resonator branches can be difficult to optimal balance due to additional thermally induced birefringence. The birefringence prevents the quarter-wave plate from properly balancing power in the polarized branches of the resonator. The upper power limit will vary according to particular resonator and component dimensions but can be simply determined by experiment. A description of an alternative three-branch resonator arrangement that is able to be balanced for optical pump power over 100 Watts per centimeter length of laser rod is set forth below with reference to FIG. 2.

Figure 2:
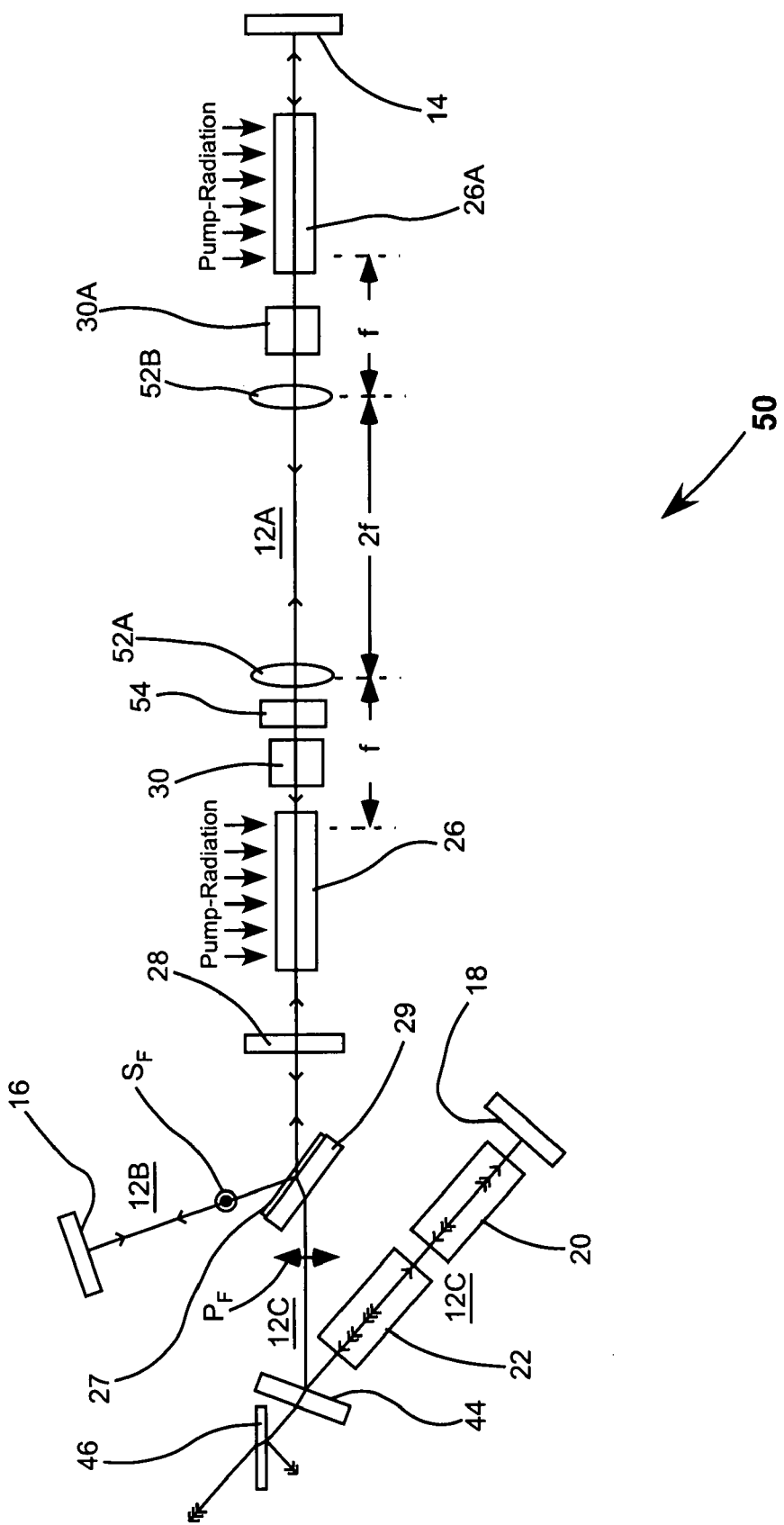
FIG. 2 schematically illustrates another preferred embodiment of a laser in accordance with the present invention, similar to the laser of FIG. 1, but wherein the third resonator-branch includes two gain rods having a refractive optical relay and a polarization-rotator therebetween.

FIG. 2 schematically illustrates preferred embodiment 50 of an intracavity frequency-tripled laser in accordance with the present invention. Laser 50 is similar to laser 10 of FIG. 1 with an exception that resonator arm 12A of laser 50 includes an additional gain rod 26A. Two lenses 52A and 52B having a positive focal length focal length f are located, spaced apart from each other by a distance 2f, between gain-rods 26 and 26A. Each of the lenses is spaced by a distance of slightly less than f from the adjacent rod, such that a principal plane of the rod (considered as a thermal lens) is spaced by distance f from the lens. The lenses form a unit-magnification relay that images one rod into the other. Q-switch 30 is located between lens 52A and rod 26. A 90° quartz polarization-rotator 54 is located between Q-switch 30 and lens 52A. It is preferable to include an additional Q-switch 30A between lens 52B and gain-rod 26A if the resonator is operated with high fundamental-wavelength circulating power, for example greater than about 1000 W. Q-switches 30 and 30A, of course, are preferably synchronized to switch simultaneously.

The apparatus of FIG. 2 is preferred to that apparatus of FIG. 1 for very high power operation requiring correspondingly high pump power. The 90-degree quartz rotator and imaging relay optics between the gain-rods provide that more than 90% of the thermally induced birefringence due to high power pumping is compensated. Accordingly, quarter-wave plate 28 can effectively circularize polarization and balance power in the polarized branches of the resonator thereby minimizing loss.

It has been experimentally determined that this arrangement can provide polarized fundamental output-power about equal to that of a comparably pumped, straight resonator, generating unpolarized laser. In the experimental laser, the frequency conversion crystals were omitted and one of the polarizing branch mirrors was configured as an output coupler. The gain-rods were 0.3%-doped, Nd:YAG rods 143.0 millimeters (mm) long, and 5.0 mm in diameter. Each gain-rod was pumped by fifty diode-laser bars, in ten longitudinally arranged groups of five, with the five bars in each group radially spaced around the rod. This provided up to 750 Watts of pump power to each rod. The relay-imaging lenses had a focus length of 10.2 cm. Fundamental output power was compared at levels between 400 and 720 W average power.

Figure 3:
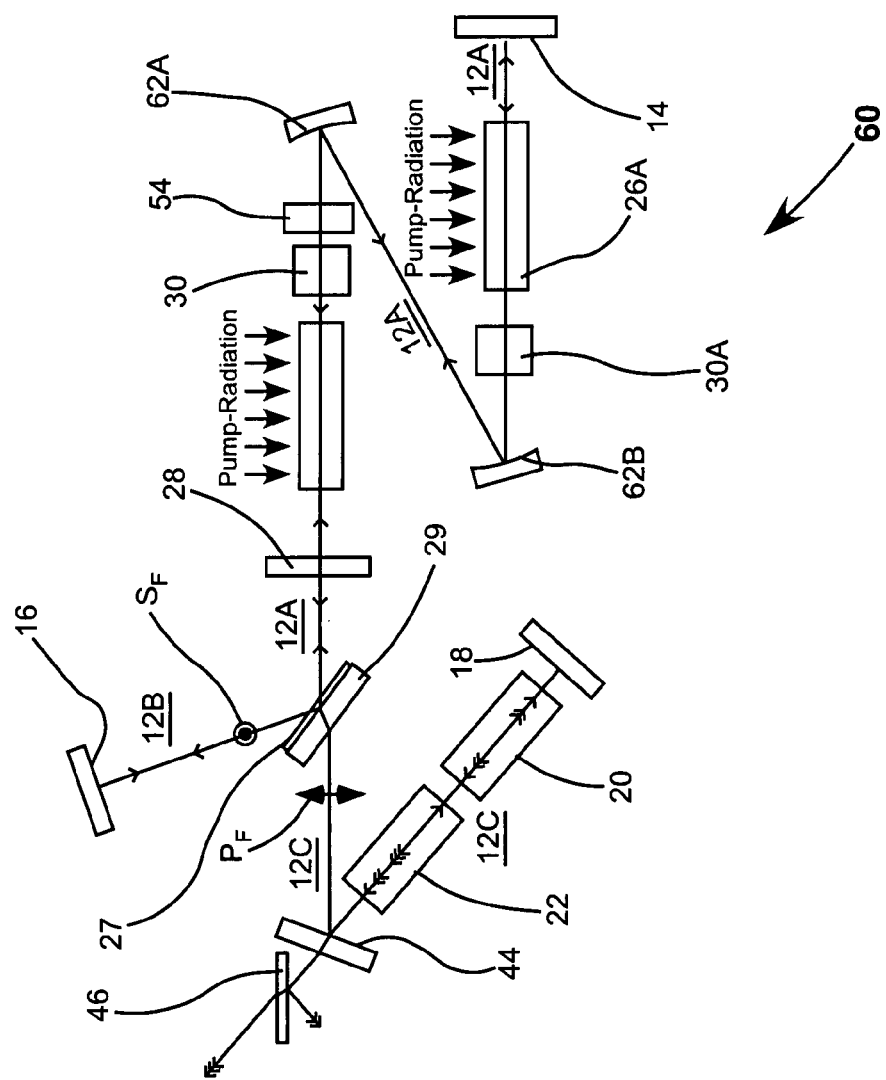
FIG. 3 schematically illustrates yet another preferred embodiment of a laser in accordance with the present invention, similar to the laser of FIG. 2, but wherein the refractive optical relay is replaced by a reflective optical relay.

FIG. 3 schematically illustrates yet another embodiment 60 of an intracavity frequency-tripled laser in accordance with the present invention. Laser 60 is similar to laser 50 of FIG. 2 with an exception that the unit-magnification refractive optical relay formed by the arrangement of lenses 52A and 52B is replaced in laser 70 by a unit-magnification reflective optical relay formed by the arrangement of concave lenses 62A and 62B each having the same focal length. Each of the mirrors is optically spaced apart from the adjacent rod by about the focal length of the mirrors, and the mirrors are spaced apart by about twice the focal length of the mirrors.

Figure 4:
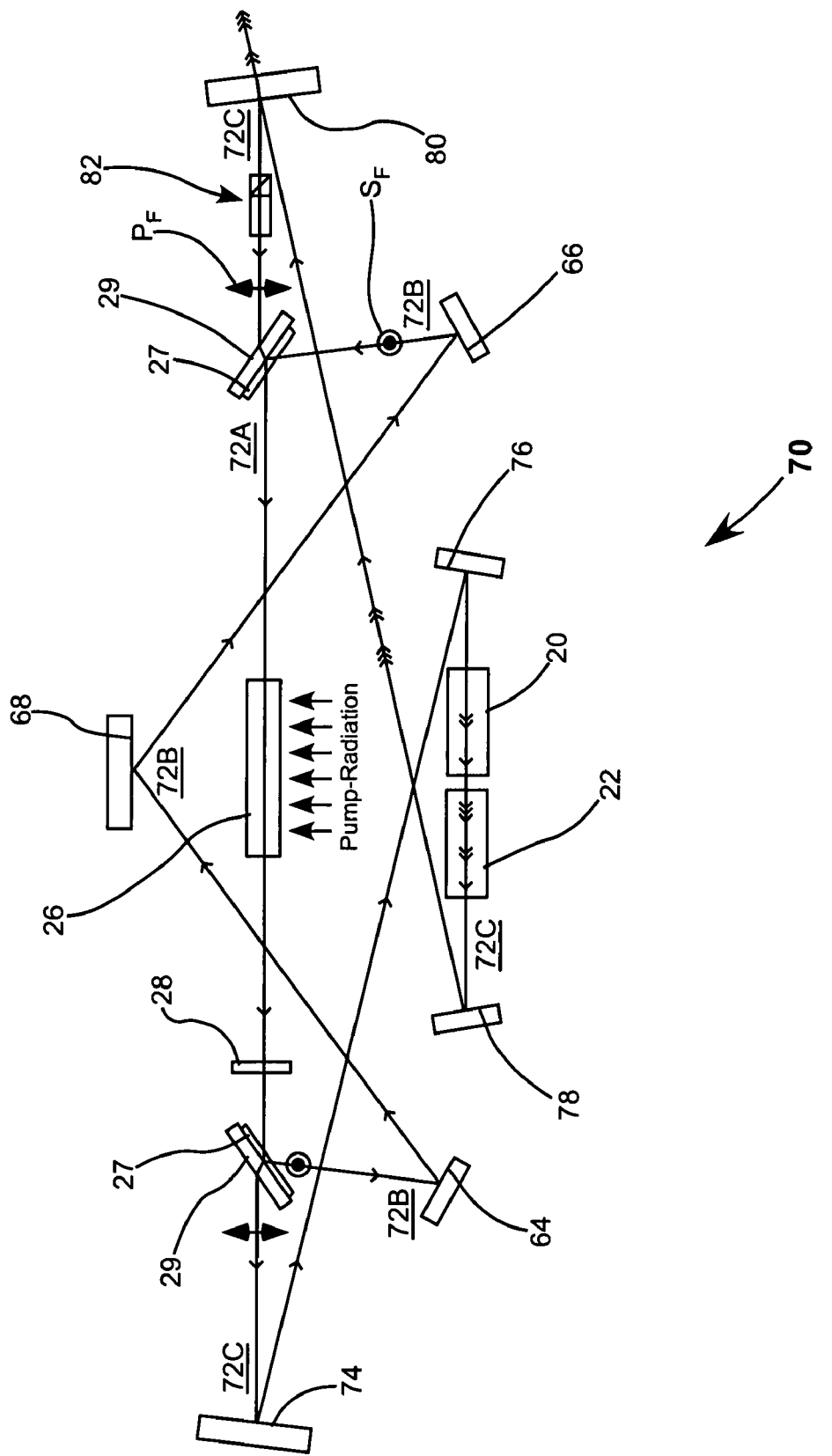
FIG. 4 schematically illustrates yet another preferred embodiment of a laser in accordance with the present invention including a traveling-wave resonator having a first branch in which circulating fundamental-wavelength radiation is p-polarized and in which a second-harmonic generating crystal and a third-harmonic generating crystal are located, a second branch in which circulating fundamental-wavelength radiation is s-polarized, and a third branch in which a gain-medium and a quarter-wave plate are located and in which circulating fundamental-wavelength radiation is essentially unpolarized, with the resonator-branches being optically connected by first and second polarization-selective reflectors at respectively first and second ends of the third resonator-branch.

FIG. 4 schematically illustrates still another embodiment 70 of a frequency-tripled laser in accordance with the present invention. Laser 70 includes a traveling-wave resonator having three branches 72A, 72B, and 72C. Resonator-branch 72B includes mirrors 64, 66 and 68. Resonator-branch 72C includes mirrors 74, 76, 78, and 80. Branches 72B and 72C are combined into resonator-branch 72A by two polarization-selective devices, one at each end of the branch, and each comprising a polarization-selective coating 27 (as described above) on a substrate 29. Gain-medium 26 and quarter-wave-plate 28 are located in resonator-branch 72A, in which fundamental-wavelength radiation is essentially unpolarized, in the sense defined above. In this traveling-wave resonator arrangement a half-wave plate may be substituted for quarter-wave plate 28.

2H- and 3H-generating crystals 20 and 22 are located in resonator-branch 72C in which fundamental-wavelength radiation is p-polarized. All mirrors are highly reflective for fundamental-wavelength radiation. Mirror 80 is also highly transmissive for 2H-radiation and 3H-radiation to allow delivery of the 3H-radiation and residual 2H-radiation from the resonator. It is also possible to make mirror 78 transmissive for the residual 2H-radiation such that only the 3H-radiation is delivered through mirror 80.

In order to make all resonator-branches unidirectional, it is only necessary to include an optical-diode in one of resonator-branches in which fundamental-wavelength radiation is polarized. This is because, although the resonator is conveniently described as having branches, these branches form a single resonator as described above, and fundamental-wavelength radiation must eventually circulate through all of the branches of this resonator. In laser 70 an optical diode 82 is included in resonator-branch 52C.

Those skilled in the art will recognize from the description provided above, without any further detailed description or illustration, that laser 70 may be adapted to include two gain-rods having a unit magnification relay therebetween in the manner of laser 50 of FIG. 2. The optical lengths of resonator branches 72B and 72C are about equal, whatever the number of gain-rods in resonator-branch 72A.

Figure 5:
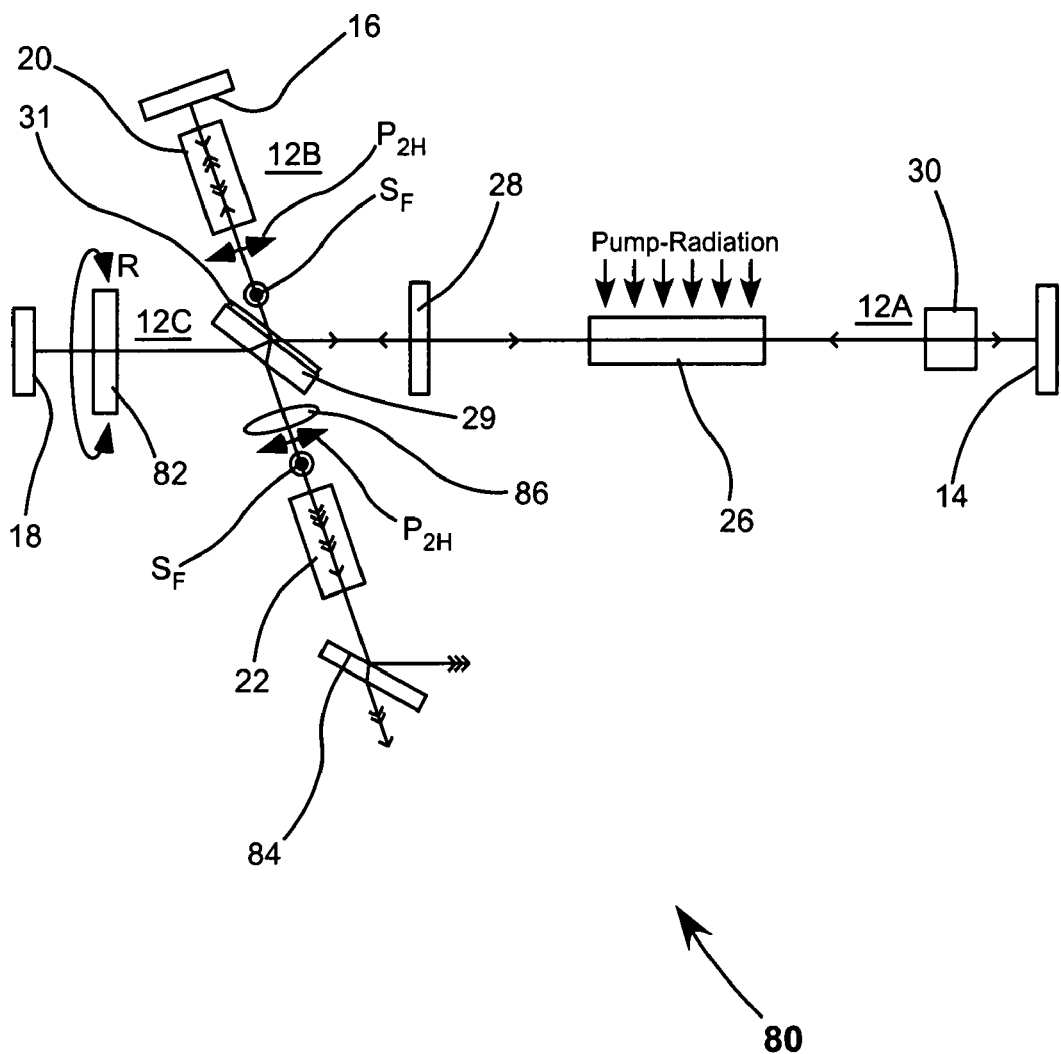
FIG. 5 schematically illustrates a further embodiment of a laser in accordance with the present invention similar to the laser of FIG. 1, but wherein there is only a first optically nonlinear crystal within the resonator, located in the second branch of the laser-resonator and arranged to generate second-harmonic radiation, wherein there is a rotatable half-wave plate in the first branch of the resonator arranged such that a portion of originally p-polarized fundamental-wavelength radiation in the first branch of the resonator is reflected out of the resonator as s-polarized fundamental-wavelength radiation, and wherein there is a second optically nonlinear crystal outside of the resonator and arranged to receive the s-polarized fundamental-wavelength radiation and p-polarized second-harmonic radiation for conversion to third-harmonic radiation.

FIG. 5 schematically illustrates a further embodiment 80 of a laser in accordance with the present invention similar to the laser of FIG. 1, but wherein only optically nonlinear crystal 20 is located within the resonator. In this embodiment crystal 20 located in branch 12B branch of the laser-resonator wherein fundamental-wavelength radiation is s-polarized with respect to the polarization-selective reflector, here designated by reference numeral 31. Polarization selective reflector 31 is highly reflective for s-polarized fundamental-radiation, and highly transmissive for p-polarized fundamental-wavelength and 2H-radiations.

Crystal 20 is arranged to generate second-harmonic (2H) radiation from a portion of the fundamental-wavelength radiation. The 2H-radiation so generated is p-polarized with respect to the polarization selective reflector and is transmitted out of the resonator by the polarization-selective reflector.

There is a half-wave plate 82 (at the fundamental wavelength) located in branch 12C of the laser-resonator. This half-wave is selectively rotatable about the propagation direction of the fundamental radiation as indicated by arrows R for selectively rotating the polarization plane of the fundamental-wavelength radiation that enters the arm polarized in a p-orientation. Polarization-rotated fundamental-wavelength radiation returned to the polarization-selective device is resolved into p-polarized and s-polarized components. The p-polarized component is transmitted by the polarization selective device into arm 12A of the laser-resonator, while the s-polarized component is reflected by the polarization-selective device out of the laser-resonator along the same path as the transmitted p-polarized 2H-radiation. A lens 86 focuses the reflected fundamental-wavelength radiation and transmitted 2H-radiation into optically nonlinear crystal 22, which is arranged for (type-II) conversion of the fundamental-wavelength and 2H radiations to 3H radiation. A dichroic beam-splitter 84 separates the 3H-radiation from the residual 2H- and fundamental-wavelength radiations.

A particular advantage of apparatus 80 is that selectively varying the polarization-rotation caused by half-wave plate 82 varies the power of fundamental-wavelength radiation coupled out of the laser-resonator, the amount of fundamental-wavelength radiation circulating in the laser-resonator, and accordingly the power of 2H radiation delivered from the laser-resonator for any particular pump power. This provides that, at any given pump power, only one simple adjustment, namely, selectively rotating half-wave plate (polarization rotator) 82, is required for optimizing third-harmonic generating efficiency in optically non-linear crystal 22.

It should be noted here that while the present invention is described above primarily in terms of an intracavity-frequency-doubled laser-resonator and intracavity-frequency-tripled laser-resonators, principles of the invention are applicable to other intracavity-frequency-conversion arrangements. Such arrangements include arrangements in which only one optically nonlinear crystal is used for optical parametric division of the fundamental-wavelength radiation in radiation at two wavelengths longer than the fundamental-wavelengths. Arrangements may also include two optically nonlinear crystals arranged for generating fourth-harmonic radiation, or three or more crystals arranged to generate fifth or higher harmonic radiation. From the detailed description of the embodiments of FIGS. 1-5, those skilled in the art can substitute these and other frequency-conversion arrangements without further illustration or detailed description. It should also be noted that while the embodiments described in detail above are described with reference to a laterally pumped gain-medium, principles of the invention applicable when any pumping scheme used with any gain-medium creates a condition wherein a conventional standing-wave resonator or traveling-wave resonator could not efficiently generate plane-polarized radiation.

In summary, the present invention is described above in terms of a preferred and other embodiments. The invention is not limited, however, to the embodiments described and depicted. Rather, the invention is limited only by the claims appended hereto.

What is claimed is:

1. A laser, comprising:
   a laser-resonator having first, second, and third branches;
   at least one gain-element located in the third branch of the resonator;
   an arrangement for optically pumping the gain-element such that laser radiation having a fundamental wavelength circulates in the laser-resonator;
   one or more polarization-selective devices optically connecting the first and second branches of the resonator to the third branch of the resonator, the polarization-selective devices and the laser-resonator being arranged such that fundamental-wavelength radiation in the first and second resonator-branches is polarized in respectively first and second orientations perpendicular to each other; and
   at least one optically nonlinear crystal located in the first branch of the resonator and arranged to convert a portion of the fundamental-wavelength radiation to frequency-converted radiation having a wavelength different from the fundamental wavelength.

2. The laser of claim 1, wherein there are first and second optically nonlinear crystals, the first crystal being arranged for frequency-doubling a portion of the fundamental-wavelength radiation, and the second crystal being arranged for converting a portion of the fundamental-wavelength radiation and the frequency-doubled radiation to third harmonic-radiation having a wavelength one-third of the fundamental wavelength.

3. The laser of claim 1, wherein the laser-resonator is a standing-wave resonator and the first, second, and third resonator-branches are optically connected by only one polarization-selective device.

4. The laser of claim 1, wherein the laser-resonator is a traveling-wave ring-resonator and the first, second, and third resonator-branches are optically connected by only two polarization-selective devices, one thereof at each end of the third resonator-branch.

5. The laser of claim 1, wherein there are two gain-elements located in the third branch of the resonator and wherein there is an optical relay and a polarization rotator located between the two gain elements.

6. The laser of claim 5, wherein the optical relay is a unit magnification optical relay.

7. The laser of claim 5, wherein the optical relay is a refractive optical relay.

8. The laser of claim 5, wherein the optical relay is a reflective optical relay.

9. The laser of claim 1, wherein there is a fractional-wave plate located in the third branch of the resonator between the at least one gain-element and the at least one polarization-selective device.

10. The laser of claim 9, wherein the fractional-wave plate is a quarter-wave plate for the fundamental wavelength.

11. A laser, comprising:
    a ring laser-resonator having first, second, and third branches;
    at least one gain-element and a fractional-wave plate located in the third branch of the resonator;

an arrangement for optically pumping the gain-element such that laser radiation having a fundamental wavelength circulates in the laser-resonator;

an optical diode positioned in one of the first and second resonator-branches such that the fundamental-wavelength radiation circulates in only one direction in the laser-resonator;

first and second polarization-selective devices optically connecting the first and second separate branches of the resonator to the third branch of the resonator; and wherein the laser-resonator, the fractional-wave plate and the polarization-selective devices are arranged such that fundamental-wavelength radiation in the first and second resonator-branches is polarized in respectively first and second orientations perpendicular to each other.

12. The laser of claim 11, wherein the fractional-wave plate is a quarter-wave plate for the fundamental wavelength.

13. The laser of claim 11, further including at least one optically nonlinear crystal located in the first branch of the resonator and arranged to convert a portion of the fundamental-wavelength radiation to frequency-converted radiation having a wavelength different from the fundamental wavelength.

14. The laser of claim 13, wherein there are first and second optically nonlinear crystals, the first crystal being arranged for frequency-doubling a portion of the fundamental-wavelength radiation, and the second crystal being arranged for converting a portion of the fundamental-wavelength radiation and the frequency-doubled radiation to third harmonic-radiation having a wavelength one-third of the fundamental wavelength.

15. A laser, comprising:
a laser-resonator having first, second, and third branches;
first and second gain-elements located in the third branch of the resonator;
a unit magnification optical relay and a polarization rotator located between the first and second gain-elements;
an arrangement for optically pumping the gain-elements such that laser radiation having a fundamental wavelength circulates in the laser-resonator;
a polarization-selective device optically connecting the first and second branches of the resonator to the third branch of the resonator;
a fractional-wave plate located in the third branch of the laser-resonator between the first gain-element and the polarization selective-device; and
wherein the polarization-selective device, the fractional-wave plate and the laser-resonator are arranged such that fundamental-wavelength radiation in the first and second resonator-branches is polarized in respectively first and second orientations perpendicular to each other.

16. The laser of claim 15, wherein the fractional-wave plate is a quarter-wave plate at the fundamental wavelength.

17. The laser of claim 16, wherein the polarization rotator is a 90-degree rotator at the fundamental wavelength.

18. The laser of claim 16, further including at least one optically nonlinear crystal located in the first branch of the resonator and arranged to convert a portion of the fundamental-wavelength radiation to frequency-converted radiation having a wavelength different from the fundamental wavelength.

19. The laser of claim 18, wherein there are first and second optically nonlinear crystals, the first crystal being arranged for frequency-doubling a portion of the fundamental-wavelength radiation, and the second crystal being arranged for converting a portion of the fundamental-wavelength radiation and the frequency-doubled radiation to third harmonic-radiation having a wavelength one-third of the fundamental wavelength.

20. The laser of claim 15, wherein the unit-magnification optical relay is a refractive optical relay.

21. A laser, comprising:
a laser-resonator having first, second, and third branches;
at least one gain-element and a fractional-wave plate located in the third branch of the resonator;
an arrangement for optically pumping the gain-element such that laser radiation having a fundamental wavelength circulates in the laser-resonator;
a polarization-selective device optically connecting the first and second branches of the resonator to the third branch of the resonator, the polarization-selective device, the fractional-wave plate and the laser-resonator being arranged such that fundamental-wavelength radiation entering the first and second resonator-branches is polarized in respectively first and second orientations perpendicular to each other;
a polarization-rotator located in the first branch of the laser-resonator and arranged for selectively rotating the plane of polarization of circulating fundamental-wavelength radiation returning to the polarization-selective device such that a portion of the fundamental wavelength radiation is directed by the polarization-selective device out of the laser-resonator polarized in the second orientation; and
a first optically nonlinear crystal located in the second branch of the resonator and arranged to convert a portion of the fundamental-wavelength radiation to second-harmonic radiation having a wavelength one-half of the fundamental wavelength and being polarized in the first-orientation, the polarization-selective device being further arranged to deliver the second-harmonic radiation out of the laser-resonator along the same path as the coupled-out fundamental radiation.

22. The laser of claim 21, further including a second optically nonlinear crystal located outside of the laser-resonator and arranged to generate third-harmonic radiation from the fundamental-wavelength radiation and second-harmonic radiation delivered from the laser-resonator.

23. The laser of claim 21, wherein the polarization-selective device is maximally reflective for fundamental-wavelength radiation polarized in the second orientation and maximally transmissive for fundamental-wavelength radiation and second-harmonic radiation polarized in the first orientation, whereby the delivered second-harmonic radiation is transmitted out of the laser-resonator by the polarization-selective device and the delivered fundamental-wavelength radiation is reflected out of the laser-resonator by the polarization-selective device.

* * * * *